J. Méry, INVENTOR

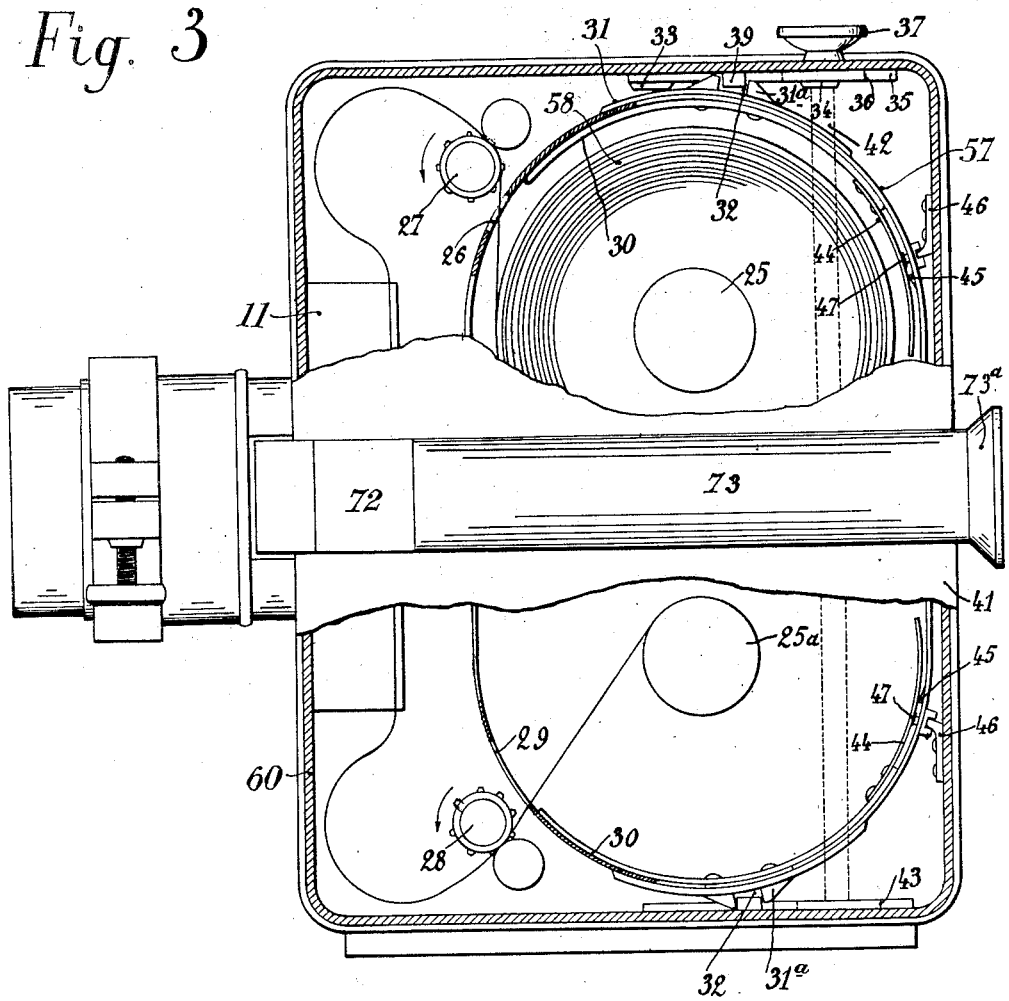

Feb. 10, 1931. J. MÉRY 1,792,436
CINEMATOGRAPHIC VIEW TAKING CAMERA OF THE PORTABLE AUTOMATIC TYPE
Filed Dec. 4, 1928 4 Sheets-Sheet 4

J. Méry, INVENTOR

Patented Feb. 10, 1931

1,792,436

UNITED STATES PATENT OFFICE

JEAN MÉRY, OF EPINAY, FRANCE

CINEMATOGRAPHIC VIEW-TAKING CAMERA OF THE PORTABLE AUTOMATIC TYPE

Application filed December 4, 1928, Serial No. 323,751, and in France December 16, 1927.

The present invention relates to the cinematographic view-taking cameras of small size which are driven by clockwork springs, and it has for its object various improvements in such apparatus by which I obtain a large opening for the shutter and eliminate the resistances due to the film boxes, also properly fastening the said boxes or the door of the camera, and can rapidly wind up the springs, and may also carry out the focusing by the reflection of the image formed by the lens.

The accompanying drawings show by way of example a constructional form of the apparatus in which the said improvements are embodied.

Fig. 3 is a side view with parts broken away showing an open film box, also the device for the automatic opening of the apertures of said box, and the travel of the film.

Figure 7:
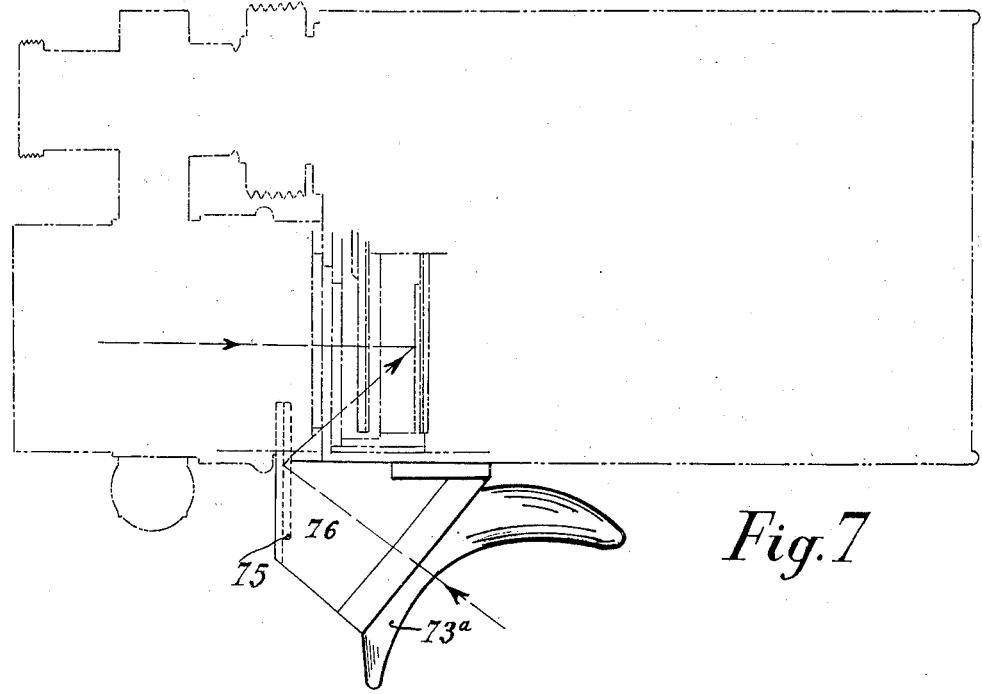

Fig. 7 relates to a modification of the focusing glass.

Figure 1:
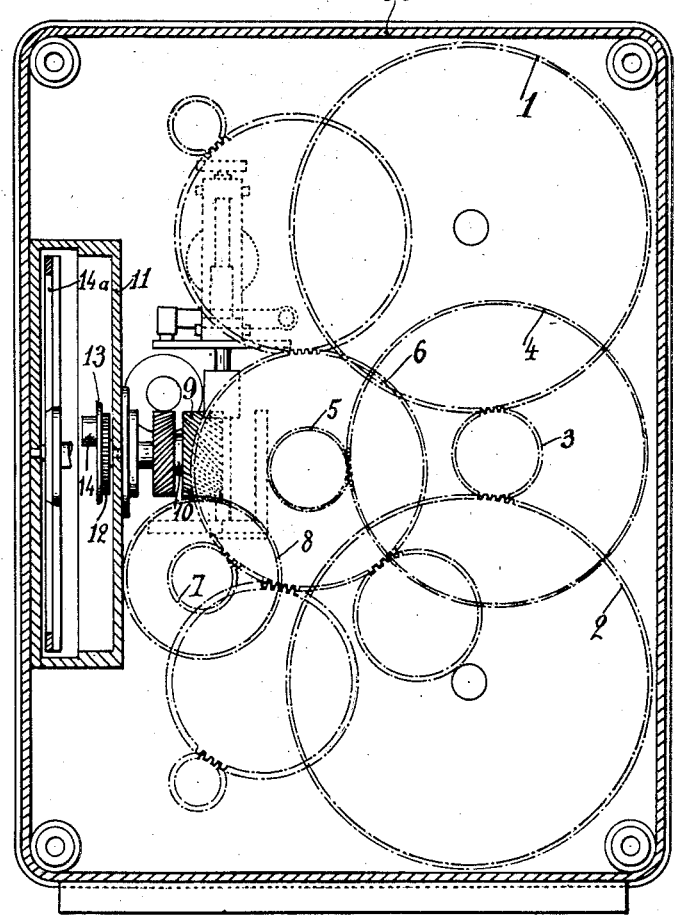
Fig. 1 is a side view of the apparatus, with the door and an inner partition removed.
Figure 2:
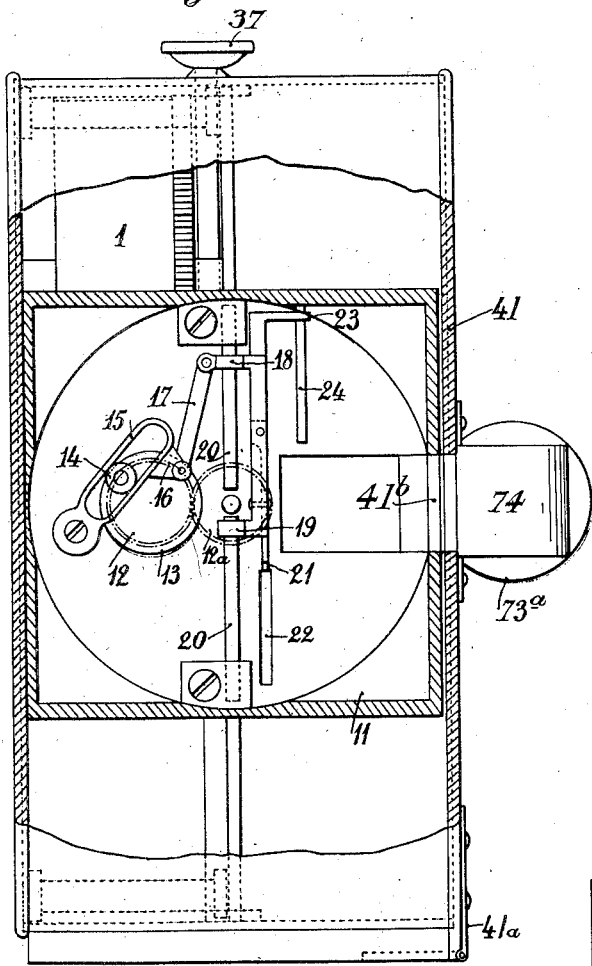
Fig. 2 is a front view with parts broken away showing the control of the shutter and the device for the intermittent film drive.
Figure 6:
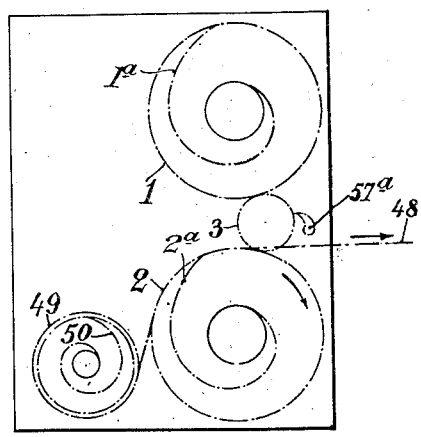
Fig. 6 is a diagrammatic view showing the operation of the spring-winding device.
Figure 4:
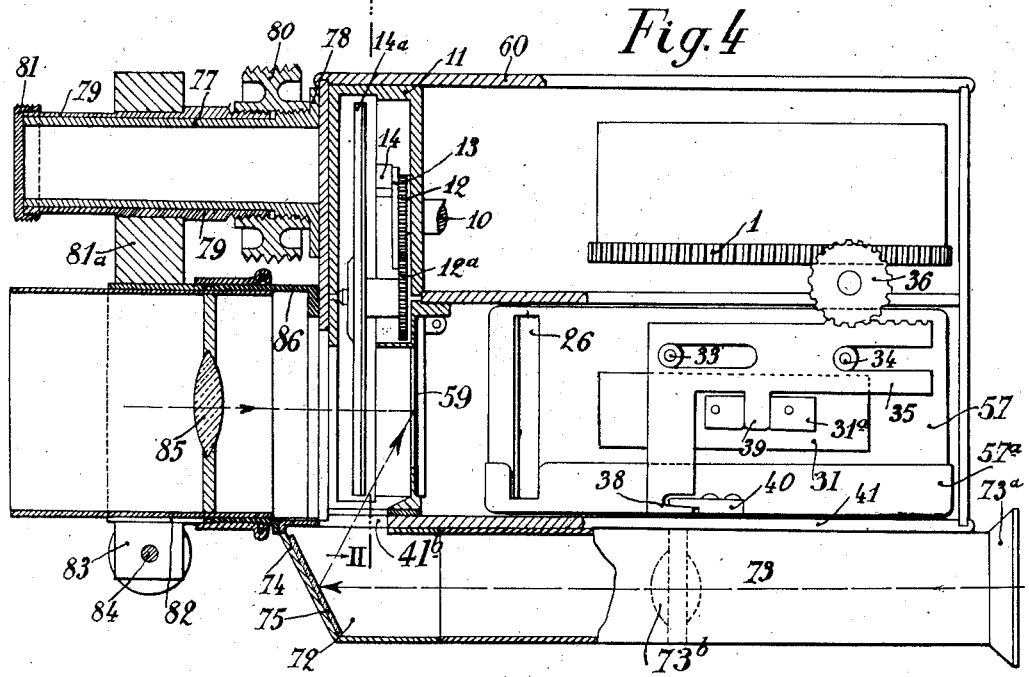
Fig. 4 is a plan view partly in section on the line IV—IV of Fig. 3, in which the part which is not in section shows the interior of the apparatus, the top of the box being removed.

The apparatus comprises two toothed barrels 1 and 2 (Figs. 1, 4 and 6) each of which contains a spiral spring 1a—2a (Fig. 6), said barrels engaging a pinion 3 whose shaft is bored for the insertion of a winding handle. The gear wheel 4 cooperating with said pinion 3 engages a pinion 5 whose shaft is bored for the insertion of an operating handle. A gear wheel 6 is secured to the pinion 5 and is in gear engagement with a pinion 7 secured to a worm 8 engaging a worm wheel 9 mounted on the shaft 10 which enters a square box 11 containing the shutter (Figs. 1, 2 and 4). On the end of said shaft 10 is a gear wheel 12 provided with a disk 13. The wheel 12 drives a wheel of like diameter 12a to whose shaft is riveted the shutter 14a.

On the disk 13 is mounted a crank pin 14 actuating a slotted lever 15 comprising a small arm 16. Under the action of the pin 14 rotating at uniform speed, the lever 15 describes a movement of oscillation about its axis and imparts this to a link 17 pivoted to the arm 16 and actuating a slide having two guiding collars 18—19. The said slide is adapted to slide by means of said collars upon vertical rods 20 placed in line, and it carries a spring pawl 21, slidable in a slot 22 and adapted to draw down the film. The pawl slides over the perforations of the film when it rises.

To maintain the direction of the frame in the plane of the image, it is provided with an arm carrying a fork 23 slidable on a fixed rod 24, parallel to the rods 20. The speed of the alternate motion imparted by said lever 15 will increase when the crank pin comes near the pivoting point of the lever, and will decrease when the crank pin recedes from this pivoting point. The position of the parts is regulated so that the high speed will correspond to the descent of the film, and this descent takes place during ¼ revolution of the disk 13, so that the period of opening of the shutter 14a can be made to last for ½ revolution or more.

The film box 57 (Figs. 3 and 4) feeds and also receives the film, and due to its shape, it has a great rigidity.

The said box is shown in Fig. 3 without its cover 57a. In the interior will be observed the cores 25—25a. Upon the core 25 is wound the film 58 whose outer end issues through an aperture 26 and engages the feeding drum 27, then forming a loop and passing through the gate 59, then making a second loop when issuing from the gate. It engages the actuating drum 28 and returns to the holder through the aperture 29, and is wound upon the core 25a.

It is observed in the drawing that the apertures are of ample size and the film can freely pass through, so that it will not be scratched or stretched, and there is no loss of the power of the driving springs. Each aperture may be closed by a curved cover 30 slidable in the interior of the box and faced with velvet on the side next the aperture. The cover is secured to an external slide 31 carrying two projections 31a forming between them a notch 32. At the top of the outer box 60 is disposed and guided by two screws 33—34 a slidable plate or latch provided with a rack and cooperating with a pinion 36 which is actuated by a control knob 37. The said plate forms a hook 38 which holds the side cover or door 41 of the box 60 by engaging a corresponding hook 40 mounted on the door on the edge opposite the hinges 41a secured to the lower part of the apparatus. The plate 35 also comprises a stud 39 engaging the notch 32.

When the pinion 36 is turned to the right (Fig. 4) the stud 39 drives the slide 31 to the left, and the door 30 closes the aperture 26. At the same time the hook 38 releases the hook 40, so that the door 41 can be opened. When the said pinion 36 is turned to the left, the aperture is opened and the door is held shut. Analogous parts are provided for the aperture 29 and they serve a like purpose. These are controlled by a pinion 43 secured to the pinion 36 by a shaft 42. A safety device is provided to prevent accidental opening of said apertures during the separate transportation of the holder 57. The said device consists of a flexible steel strip 44 secured to the back of the door 30, and the end of said strip makes contact with a stud 45 mounted on the holder 57 when the said aperture is closed, so that the door 30 cannot be opened.

When the holder 57 is placed in the apparatus, a ramp 46 on the box 60 drives out a piston 47 mounted on the box 57, and said piston thus pushes the strip 44 inwardly and releases it from the stud 45, so that the door can be moved to uncover the aperture.

In an apparatus of this class, the driving springs 1a—2a must be wound up twice in order to circulate the whole length of the film contained in the holder, so that it is an important feature to be able to wind the springs rapidly and easily. This result is obtained by the use of a cable or chain 48 (Fig. 6), and the cable is wound for instance six times about a small barrel 49 containing a spiral spring 50, and it is then wound three times around the barrel 2. When the operator draws the said cable in the direction of the arrow, the cable turns the barrel by adhesion, and winds up the spring 50 of the barrel 49 to which the end of the cable is attached.

When the cable is allowed to return under the action of the spring 50, the said cable will then slide on the barrel 2. The pinion 3 is provided with a ratchet device 57d to prevent all back motion of the barrel 2 when the cable is returned. By drawing one or more times upon the said cable, the barrels 1 and 2 can be thus wound up. The outer end of the cable 48 may be attached to a belt which is fitted to the operator's body or may be placed about his neck, and the operator while holding the camera in the hands, need only extend the arms by an abrupt movement and then bring them back, in order to wind up the device.

The camera is provided with an observing lens which aids in the focusing by allowing the image on the film given by the camera lens to be examined.

Referring to Figs. 3 and 4, it is observed that to the middle of the door 41 is secured a tube 73 containing a lens or magnifying glass 73b and provided at the rear and with eye piece 73a and at the other end with a socket 72 whereof one wall 74 carries a small mirror 75 serving to reflect to the said lens the image formed by the camera lens on the film, so that the operator can perform the focusing operations in spite of the oblique position of the image. Fig. 4 shows an aperture 41b formed in the door, and also in the front wall and the lens socket, so that this image can be observed. When the door 41 is opened, it carries with it the magnifying glass and mirror, and when it is shut, these latter are closely applied against the box.

Fig. 7 relates to a modification of the said focusing device, and herein the operator may apply his right cheek to the door of the apparatus, the tube of said device being reduced to a chamber 76, the aforesaid eye-piece having the oblique position so that it will fit upon the operator's eye-socket. He will thus see the reflected image in a less oblique manner, as shown by the lines representing the reflected rays (Figs. 4 and 7).

The said eyepiece, which is made of flexible rubber, will fit exactly upon the eye socket, thus avoiding all danger of fogging by the entrance of light, and thus the operator may not only focus the image but may also follow the film scene in all its movements. Also, due to the force of the muscles of the arm and neck, the camera placed against the cheek will be more firmly secured than when it is simply held in the hands.

Figure 5:
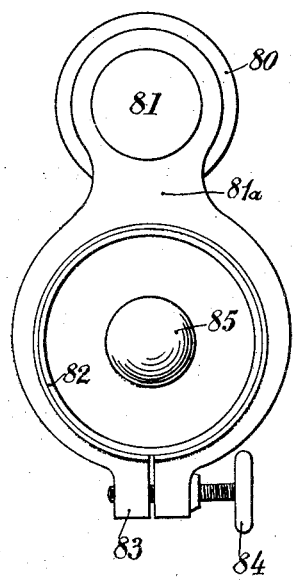
Fig. 5 is an end view of the lens and its support.

The said apparatus further comprises a very simple and practical focusing device, as shown in Figures 4 and 5.

In the cinematographic apparatus in which the film is disposed in a stationary gate, the image is focused by moving the lens back and forth upon its optical axis.

A tube 77 with flange 78 is mounted on the front wall of the camera, and said tube carries adjacent the flange a threaded part which has for instance a right-handed thread. A second tube 79 is slidable on the tube 77 and has a left-handed thread at the end adjacent the first-mentioned thread. A large milled socket or knob 80 whose bore carries two oppositely-disposed threads, connects the threaded parts of the tubes 78 and 79, and when rotated it moves the tube 79 in either direction, said tube being closed at the outer end by a screw plug 81. To the middle of the tube 79 is secured a rigid arm or support 81a of which an elevational view is shown in Fig. 5. The said arm surrounds a lens tube 82 which is secured thereto, and both are split at 83 so that the lens 85 may be held by means of the screw knob 84.

When the operator places the camera against his right eye, pressing it tightly against the cheek, the camera can be then focused by turning the milled knob 80 with one finger of the right hand.

A tube device 86 is secured to the front wall, and it serves to guide the lens tube which slides by easy friction parallel to the tube support 77.

I claim:

In a view-taking cinematographic apparatus, the combination of a rotary disk shutter, a gear wheel operatively connected to said disk in such manner as to rotate at the same speed, a crank pin mounted on the said wheel, a pivoting slotted lever, the slot of said lever being engaged with said crank pin, vertical guides, a slide movable in said guides, a driving pawl cooperating with one of the perforated edges of the film, said pawl being spring mounted on said slide, and a link connecting said slide to said slotted lever, the pivot axis of said lever being eccentric with reference to said wheel carrying the crank pin.

In testimony whereof I have hereunto affixed my signature.

JEAN MÉRY.